Oct. 26, 1943.  C. D. WEST  2,332,958
COATING COMPOSITION
Filed Nov. 12, 1941
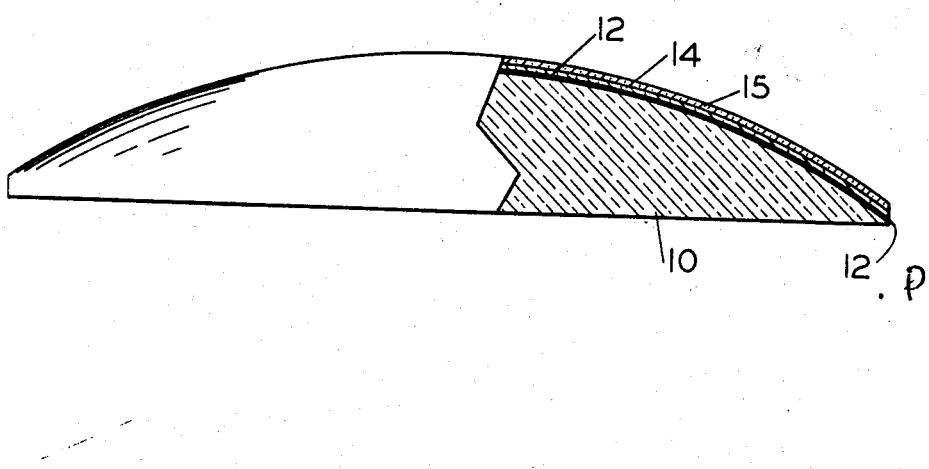
Cutler D. West
INVENTOR.
BY Donald L. Brown
Attorney Patented Oct. 26, 1943

Search Room 2,332,958

UNITED STATES PATENT OFFICE 2,332,958

COATING COMPOSITION

Cutler D. West, Cambridge, Mass., assignor to Polaroid Corporation, Dover, Del., a corporation of Delaware Application November 12, 1941, Serial No. 418,677

9 Claims. (Cl. 88—65)

This invention relates to coating compositions, and more particularly to a coating composition suitable for use in the production of light-polarizing material.

There has been developed a light-polarizing material comprising an exceedingly thin film of a plastic of the class consisting of polyvinyl alcohol and polyvinyl acetal containing oriented dichroic material. This material may be formed as a layer or film on a supporting surface such as a lens by rubbing the support in a uniform direction with the desired plastic. This rubbing operation causes the plastic to be deposited on the surface as an exceedingly thin film of molecularly oriented material. The resulting thin film of oriented plastic may then be converted into a light-polarizing material by incorporating therein a suitable dichroic dye or stain or by heat treating the deposited film in the presence of a suitable catalyst. In view of the extreme thinness of the film and the relatively high concentration of polarizing material therein, a polarizer so formed may be somewhat more readily oxidized or bleached in the presence of air than the thicker sheet polarizers heretofore made.

It is accordingly one of the objects of this invention to provide means for protecting a polarizing film of the above type from oxidation.

Another object of the invention is to provide for a polarizer of the above type a protective film which will prevent its gradual bleaching out on exposure to air.

A further object is to protect such a polarizer from oxidation by providing a protective coating consisting of a thin layer of a plastic of the same class as that from which the polarizing film is formed.

A still further object is to provide, as a new article of manufacture, a light-polarizing device comprising a transparent support having a polarizing film of the above type adhering to one surface thereof and having said polarizing film provided not only with an oxidation-preventing coating but also with an abrasion-resistant coating.

Other objects and advantages will in part appear and in part be pointed out in the course of the following description of one embodiment of the invention, which is given as a non-limiting example, in connection with the accompanying drawing, which is a side view, partly in section, of a condenser lens having on one surface a polarizing film of the above type provided with coating compositions embodying a form of the invention.

In the drawing, lens 10 is represented as having on its curved surface a layer of dichoic-light-polarizing material, indicated by heavy line 12. In the preferred embodiment of the invention, polarizing layer 12 comprises an exceedingly thin film of a plastic of the class consisting of polyvinyl alcohol and polyvinyl acetal, the preferred material being polyvinyl alcohol. Such a film may be formed, for example, by bringing said lens surface into contact with the relatively rapidly moving mass of the desired plastic, as for example a rapidly rotating belt of said material, and so controlling contact between said elements that a molecularly oriented plastic coating of uniform thickness is formed on the entire surface of said lens. This film, which may, for example, by approximately .00010–.00015 inch in thickness, may then be converted into a light polarizer by incorporating therewith a suitable dichroic dye or stain, or, for example, by treating said film substantially in accordance with U. S. Patent No. 2,173,304.

The resulting polarizer will be found to contain dichroic material in a concentration far greater, for example in the order of ten times greater, than sheet polarizing material formed in accordance with said patent, and it appears that it is this increased concentration of dichroic material which is to a considerable extent responsible for the susceptibility of the material to oxidation.

In accordance with the present invention, this tendency to oxidation is inhibited by providing said polarizing material with a protective coating comprising a relatively thin, optically isotropic layer of a plastic of the same class, the preferred material being polyvinyl alcohol, particularly if the same material is used in polarizing layer 12. Such a layer is indicated at 14 in the drawing and may, for example, be .0005–.0010 inch in thickness. It may be applied to the polarizing material in any convenient way, as for example by being cast thereon with the aid of a suitably curved doctor. Alternatively, layer 14 may be laminated to polarizing material 12 in sheet form, or it may be spun thereon by pouring a solution of polyvinyl alcohol over the polarizing surface while the lens is rotated face up on its optical axis.

In view of the fact that plastic layer 14 is relatively soft and also water-permeable, it is desirable that it in turn be provided with a suitable, moisture-proof and abrasion-resistant coating. Such a coating is indicated at 15 in the drawing and may be formed from any of a variety of light-transmitting plastics. The materials found suitable for this purpose particularly transparent, thermo-setting resins, the preferred materials being resins of the urea-formaldehyde type such, for example, as urea-formaldehyde or melamine-formaldehyde.

Resins of the above type in substantially pure form are in general too brittle for the purposes of the present invention, but their physical properties may be modified by the addition thereto of various so-called "alkyd modifiers." Moreover, there are commercially available plastic compositions suitable for use in layer 15 which comprise resins already having incorporated therein one or more suitable modifiers, an illustrative example being the material sold under the trade name "Polymerin," a product of Ault & Wiborg Corporation. Alternatively, layer 15 may be formed from the melamine-formaldehyde resin sold under the trade name "Uformite MM-55" modified with an oxidizing alkyd modifier such as those sold under the trade names "Duraplex A-25" or "Duraplex A-27", or there may be used a urea-formaldehyde resin such as that sold under the trade name "Uformite F-200" modified with approximately an equal part of "Duraplex A-27", all of said materials being products of Resinous Products & Chemical Co., Inc. Many similar compositions for producing an abrasion-resistant coating of the same properties will doubtless be apparent to those skilled in the art and are to be construed as being within the scope of the invention and of the claims herein.

Coating 15 may be applied in any of the ways described for layer 14, and it should then be hardened as, for example, by submission to a moderate baking operation, care being taken to maintain the temperature below the point at which any of the other materials may be affected. This operation may be substantially simplified by the use of a suitable catalyst, for example an acid catalyst such as hydrochloric acid, and may under such conditions be completed in from three to five minutes at a temperature of approximately 100° C. It will be understood that many variations in coating 15 and the manner of applying the same may be used without in any way departing from the scope of the invention.

The protective coatings of the present invention and the polarizing material with which they are preferably combined are particularly useful in connection with curved supports, such as the lens shown in the drawing, which make it difficult or impractical to use sheet polarizing materials in laminated form. The resulting structure will be found in general to be equally effective as a polarizer and in stability to the laminated sheet polarizers of the prior art. Moreover, they possess marked advantages with respect to the cost of manufacture and of the materials involved.

If a polarizing device such as the lens shown in the drawing is to be used under conditions where it may be subjected to impact, particularly relatively severe impact, it may be found desirable to include between oxygen-barrier layer 14 and abrasion-resistant layer 15 an additional, impact-resistant layer formed from a resilient plastic. Such a cushion layer may be formed in the same manner as layers 14 and 15 from a thermo-setting resin such as the urea-formaldehyde type mentioned above, modified with a non-oxidizing, substantially non-setting modifier. Any of the resins mentioned above in connection with layer 15 will be found suitable for this purpose in combination with a non-oxidizing, non-setting modifier such, for example, as that sold under the trade name "Paraplex G-20," a product of Resinous Products & Chemical Co., Inc. As an illustrative example, said layer may be formed from a mixture of approximately three parts "Polymerin" and one part "Paraplex G-20." It should be pointed out, however, that barrier layer 14 will itself be sufficient as a cushion to protect polarizing layer 12 from moderate impact.

Since certain changes may be made in the above product and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

What is claimed is:

1. A light-polarizing device comprising, in combination, a transparent supporting element, means providing a dichroic light-polarizing surface on said support, said polarizing means comprising an exceedingly thin film of a plastic of the class consisting of polyvinyl alcohol and polyvinyl acetal, the molecules in said film being oriented to substantial parallelism, the polarizing properties of said film being derived from a relatively high concentration of polarizing material therein, means for protecting said polarizing film against oxidation comprising a relatively thin layer of one of said plastics adhering to said polarizing film, and means providing a light-transmitting, moisture-proof, abrasion-resistant coating adhering to said second-named plastic layer.

2. A light-polarizing device comprising, in combination, a transparent supporting element, means providing a dichroic light-polarizing surface on said support, said polarizing means comprising an exceedingly thin film of a plastic of the class consisting of polyvinyl alcohol and polyvinyl acetal, the molecules in said film being oriented to substantial parallelism, the polarizing properties of said film being derived from a relatively high concentration of polarizing material therein, means for protecting said polarizing film against oxidation comprising a relatively thin layer of polyvinyl alcohol adhering to said polarizing film, and means providing a light-transmitting, moisture-proof, abrasion-resistant coating adhering to said second-named plastic layer.

3. A light-polarizing device comprising, in combination, a transparent supporting element, means providing a dichroic light-polarizing surface on said support, said polarizing means comprising an exceedingly thin film of polyvinyl alcohol having its molecules oriented to substantial parallelism, the polarizing properties of said film being derived from a relatively high concentration of polarizing material therein, means for protecting said polarizing film against oxidation comprising a relatively thin layer of a plastic of the class consisting of polyvinyl alcohol and polyvinyl acetal adhering to said polarizing film, and means providing a light-transmitting, moisture-proof, abrasion-resistant coating adhering to said second-named plastic layer.

4. A light-polarizing device comprising, in combination, a transparent supporting element, means providing a dichroic light-polarizing surface on said support, said polarizing means comprising an exceedingly thin film of polyvinyl alcohol having its molecules oriented to substantial parallelism, the polarizing properties of said film being derived from a relatively high concentration of polarizing material therein, means for protecting said polarizing film against oxidation comprising a relatively thin layer of polyvinyl alcohol adhering to said polarizing film, and means providing a light-transmitting, moisture-proof, abrasion-resistant coating adhering to said second-named plastic layer.

5. A light-polarizing device comprising, in combination, a transparent supporting element, means providing a dichroic light-polarizing surface on said support, said polarizing means comprising an exceedingly thin film of a plastic of the class consisting of polyvinyl alcohol and polyvinyl acetal, the molecules in said film being oriented to substantial parallelism, the polarizing properties of said film being derived from a relatively high concentration of polarizing material therein, means for protecting said polarizing film against oxidation comprising a relatively thin layer of one of said plastics adhering to said polarizing film, and means for protecting said device from abrasion and moisture, said protecting means comprising a coating of a light-transmitting, thermo-setting plastic adhering to said second named plastic layer.

6. A light-polarizing device comprising, in combination, a transparent supporting element, means providing a dichroic light-polarizing surface on said support, said polarizing means comprising an exceedingly thin film of polyvinyl alcohol having its molecules oriented to substantial parallelism, the polarizing properties of said film being derived from a relatively high concentration of polarizing material therein, means for protecting said polarizing film against oxidation comprising a relatively thin layer of polyvinyl alcohol adhering to said polarizing film, and means for protecting said device from abrasion and moisture, said protecting means comprising a coating of a light-transmitting, thermo-setting plastic adhering to said polyvinyl alcohol layer.

7. A light-polarizing device comprising, in combination, a transparent supporting element, means providing a dichroic light-polarizing surface on said support, said polarizing means comprising an exceedingly thin film of a plastic of the class consisting of polyvinyl alcohol and polyvinyl acetal, the molecules in said film being oriented to substantial parallelism, the polarizing properties of said film being derived from a relatively high concentration of polarizing material therein, means for protecting said polarizing film against oxidation conprising a relatively thin layer of one of said plastics adhering to said polarizing film, and means for protecting said device from abrasion and moisture, said protecting means comprising a layer of a urea-formaldehyde type resin modified with an oxidizing alkyd modifier, said layer adhering to said second named plastic layer.

8. A light-polarizing device comprising, in combination, a transparent supporting element, means providing a dichroic light-polarizing surface on said support, said polarizing means comprising an exceedingly thin film of polyvinyl alcohol having its molecules oriented to substantial parallelism, the polarizing properties of said film being derived from a relatively high concentration of polarizing material therein, means for protecting said polarizing film against oxidation comprising a relatively thin layer of polyvinyl alcohol adhering to said polarizing film, and means for protecting said device from abrasion and moisture, said protecting means comprising a layer of a urea-formaldehyde type resin modified with an oxidizing alkyd modifier, said layer adhering to said polyvinyl alcohol layer.

9. A light-polarizing device comprising, in combination, a transparent supporting element, means providing a dichroic light-polarizing surface on said support, said polarizing means comprising an exceedingly thin film of polyvinyl alcohol having its molecules oriented to substantial parallelism, the polarizing properties of said film being derived from a relatively high concentration of polarizing material therein, means for protecting said polarizing film against oxidation comprising a relatively thin layer of polyvinyl alcohol adhering to said polarizing film, and means for protecting said device from abrasion and moisture, said protecting means comprising a relatively thin coating of "Polymerin" adhering to said polyvinyl alcohol layer.

CUTLER D. WEST.